United States Patent
Ghovanloo et al.

(10) Patent No.: US 9,294,154 B2
(45) Date of Patent: Mar. 22, 2016

(54) ENHANCED INDUCTIVE POWER AND DATA TRANSMISSION USING HYPER RESONANCE

(71) Applicant: Georgia Tech Research Corporation, Atlanta, GA (US)

(72) Inventors: Maysam Ghovanloo, Atlanta, GA (US); Dukju Ahn, Atlanta, GA (US); Mehdi Kiani, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 16 days.

(21) Appl. No.: 14/207,199

(22) Filed: Mar. 12, 2014

(65) Prior Publication Data

US 2014/0273835 A1    Sep. 18, 2014

Related U.S. Application Data

(60) Provisional application No. 61/776,901, filed on Mar. 12, 2013.

(51) Int. Cl.
    *H04B 5/00*    (2006.01)
(52) U.S. Cl.
    CPC ............ *H04B 5/0037* (2013.01); *H04B 5/0031* (2013.01); *H04B 5/0075* (2013.01)
(58) Field of Classification Search
    CPC ... G06K 19/0723; G06K 7/0008; H04B 5/02; H04B 5/0012; H04B 5/00
    USPC ............ 455/41.1, 77, 78, 127.1, 127.5, 550.1
    See application file for complete search history.

(56) References Cited

U.S. PATENT DOCUMENTS

| | | | |
|---|---|---|---|
| 5,928,143 | A | 7/1999 | McNaughton |
| 6,400,991 | B1 | 6/2002 | Kung |
| 2005/0075696 | A1 | 4/2005 | Forsberg et al. |
| 2006/0076922 | A1 | 4/2006 | Cheng et al. |
| 2007/0279002 | A1 | 12/2007 | Partovi |
| 2012/0244822 | A1 | 9/2012 | Kim et al. |
| 2012/0248889 | A1 | 10/2012 | Fukushi et al. |

(Continued)

FOREIGN PATENT DOCUMENTS

WO          2009155030         12/2009
WO  PCT/KR2012/007735         9/2012

OTHER PUBLICATIONS

International Search Report and Written Opinion dated Jan. 12, 2011 issued by the United States Patent and Trademark Office for corresponding PCT Application No. PCT/US2009/045418.

(Continued)

*Primary Examiner* — Nhan Le
(74) *Attorney, Agent, or Firm* — Troutman Sanders LLP; Ryan A. Schneider; Daniel Sharpe

(57) ABSTRACT

A method of wirelessly transmitting power or data is disclosed. The method may include the step of providing a transmitter including a driver coil and a first transmitter resonator coil. The driver coil may have a driver coil resonance frequency, and the first transmitter coil may have a first transmitter resonator coil resonance frequency. The method may further include the step of providing a receiver including a load coil having a load coil resonance frequency. Furthermore, the method may include tuning the first transmitter coil resonance frequency to be higher than both of the driver coil resonance frequency and the load coil resonance frequency.

12 Claims, 12 Drawing Sheets

(56) References Cited

U.S. PATENT DOCUMENTS

| | | |
|---|---|---|
| 2012/0311356 A1 | 12/2012 | Tan |
| 2012/0313577 A1* | 12/2012 | Moes et al. ............. 320/108 |
| 2013/0033118 A1 | 2/2013 | Karalis et al. |
| 2013/0038402 A1 | 2/2013 | Karalis et al. |
| 2013/0057080 A1* | 3/2013 | Smith et al. ............. 307/104 |
| 2013/0069753 A1 | 3/2013 | Kurs et al. |
| 2013/0082535 A1 | 4/2013 | Miyauchi et al. |

OTHER PUBLICATIONS

Puers, et al.; Wireless Inductive Transfer of Power and Data; SPRINGER; 2006.

\* cited by examiner $$Z_{in} = j\omega L_{21}\left(1 + \frac{k_{21,22}^2}{\frac{\omega_M^2}{\omega_0} - 1}\right), \quad \omega_M = \frac{1}{\sqrt{L_{22}C_{22}}}$$

< Source resistance = 0 >  < Source resistance = 2 Ohm >

Low permeability is sufficient for high efficiency     Higher permeability is needed for high efficiency

ENHANCED INDUCTIVE POWER AND DATA TRANSMISSION USING HYPER RESONANCE

CROSS REFERENCE TO RELATED APPLICATION

This application claims benefit, under 35 U.S.C. §119(e), of U.S. Provisional Application Ser. No. 61/776,901, filed 12 Mar. 2013, the entire contents and substance of which are hereby incorporated by reference.

STATEMENT REGARDING FEDERALLY SPONSORED RESEARCH OR DEVELOPMENT

This invention was made with Government support under Agreement/Contract Number 1 R21 EB009437-01A1, awarded by the National Institutes of Health, and 0824199, awarded by the National Science Foundation. The Government has certain rights in the invention.

BACKGROUND

Embodiments of the present disclosure relate to an inductive power and data transmission system and, more particularly, to an improved power and data transmission system that uses hyper resonance.

Inductive power transmission links that utilize a pair of mutually coupled coils have been in use for decades to, for example, power radio frequency identification (RFID) transponders and cochlear implants. These components typically have with power consumption in the range of microwatts ($\mu$W) to milliwatts (mW). The use of this technique to wirelessly transfer energy across a short distance is expected to see an explosive growth over the next decade in a much broader range of applications from advanced implantable microelectronic devices (IMD), such as, for example and not limitation, retinal implants and brain computer interfaces (BCI), contactless smartcards, and wireless microelectromechanical systems (MEMS). This technology can also be used to obviate the power cord in charging mobile gadgets, operating small home appliances, and energizing electric vehicles, which have higher levels of power consumptions on the order of hundreds of milliwatts (mW) to kilowatts (kW).

An inductive link between two magnetically-coupled coils ($L_2$ and $L_3$ in FIG. 1A) is one of the most common methods for wireless power transmission. The coupling coefficient between the two coils, $L_2$ and $L_3$, is represented by $k_{23}$, which can be found from $k_{23}=M_{23}/(L_2 \times L_3)^{0.5}$, where $M_{23}$ is the mutual coupling between the two coils, which is proportional to $d^{-3}$, where d is the center-to-center spacing between the coils when they are in parallel planes and perfectly aligned. Capacitors, $C_2$ and $C_3$, are added in parallel or series to the coupled coils to form resonant LC tank circuits. By tuning these LC tank circuits at the wireless link carrier frequency ($f=\frac{1}{2}\pi(L_2 \times C_2)^{0.5}=\frac{1}{2}\pi(L_3 \times C_3)^{0.5}$), the amplitude of the received signal on the receiver (Rx) side (i.e. across $L_3$) can be significantly increased, while attenuating the out of band interference.

A key requirement in all of the above applications, however, is delivering sufficient power to the load with high power transfer efficiency (PTE) when the distance, d, between $L_2$ and $L_3$, is relatively large or the coils are misaligned, i.e. when M is very small. An increase in PTE reduces heat dissipation within the coils, exposure to AC magnetic field, size of the main energy source (e.g. battery), and interference with nearby electronics to satisfy regulatory requirements. Therefore, design, theoretical analysis, and geometrical optimization of the conventional 2-coil inductive link has been extensively studied over the last few decades. More recently, a 4-coil power transmission link, which operates based on coupled-mode magnetic-resonance, was proposed to further increase the PTE, particularly at large d. In the 4-coil arrangement, as shown schematically in FIG. 1B, a pair of coils is used on the transmitter (Tx) side, which are referred to as the driver, $L_1$, and primary, $L_2$, coils. A second pair of coils is used on the Rx side, which is referred to as the secondary, $L_3$, and load, $L_4$, coils. Conventionally, all of these coils are tuned at the same resonance frequency, f, using capacitors $C_1$-$C_4$ ($f=\frac{1}{2}\pi(L_{1-4} \times C_{1-4})^{0.5}$). The coils' parasitic resistances are also represented by lumped components, $R_1$-$R_4$. Utilizing the 4-coil method, however, increases the PTE at large d at the cost of a significant reduction in the power delivered to the load (PDL). It has also been demonstrated that a 3-coil inductive power transfer link (FIG. 1C) that uses one coil at the primary, $L_2$, and two coils at the secondary, $L_3$ and $L_4$, all tuned to the same frequency, provides as high PTE as the 4-coil method and also offers a PDL that is significantly higher than both 2- and 4-coil links at large d.

The reason for small PTE at large d is the significant reduction in the magnetic coupling between the coils, M, which is proportional to $d^{-3}$. One way to compensate for small M is to reduce the loss of the coils. This involves using very high quality-factor (Q) coils, which is the equivalent of reducing the wire conductor losses and loading effects of the source and load resistances. Placing intermediate resonators, which are also called repeaters, between the Tx and Rx coils to receive the magnetic field from Tx and then relay the field to Rx, has shown considerable increase in the magnetic coupling and, therefore, PTE at large d. Such repeaters are also tuned to the same frequency as the Tx and Rx coils. Although such intermediate field repeaters increase the PTE, they reduce the effective distance between the Tx and Rx and their use is limited in most applications such as, for example, IMDs and RFID.

Metamaterials, which are artificial composites with engineered electromagnetic properties to achieve positive or negative effective permittivity and permeability, have recently been used to increase the PTE of the inductive link Metamaterials are fabricated by repeating a 3D resonant element to constitute a periodic structure. Although metamaterials have been studied and have shown significant benefits in many fields, such as microwaves, optics, and acoustics, the design of such 3D structures is quite complicated. Moreover, the metamaterials are suited for short wavelength or high frequency application, whereas the wireless power transfer systems generally utilize low frequencies. Therefore, conventional methods of using metamaterials are generally not feasible.

High-frequency electromagnetic waves have also been considered for wireless power transmission. Although the high-frequency link can offer reliable communication, the received power by the high-frequency antenna is still small (on the order of microwatts) for most aforementioned applications. Furthermore, the significant electromagnetic-field absorption in human tissue increases the losses of the tissue and, therefore, increases the tissue temperature. This can cause safety issues in biomedical implant applications. Moreover, since far field electromagnetic waves attenuate at a rate of $1/d^2$, there is a high degree of interference with other nearby electronic appliances.

It has also been shown that different resonance frequencies or different distances between Tx, repeater, and Rx coils would result in higher performance. In such a system, the repeater is located close to the Tx coil, which results in a strong coupling between these coils and a lower effective resonance frequency due to frequency splitting. In this configuration, the Tx and repeater can be tuned at a higher frequency to operate the whole link at the same resonance frequency as the driver switching frequency (f) to achieve the maximum voltage gain.

Embodiments of the present disclosure are related to an inductive link comprising two or more resonators on the Tx side as shown in FIG. 2. The additional resonators enhance the magnetic resonance and the overall PTE. Unlike conventional designs, the resonance frequency of the additional resonators can be higher than the operating frequency. By adjusting the resonance frequencies of the additional resonators within the Tx, the degree of magnetic resonance between Tx and Rx coils can be controlled.

The transmitter and repeaters, which can be placed in close proximity to the Tx coil, can effectively be regarded as one transmitter with two or more resonators. The resonance frequencies of the repeaters can also be designed to be higher than the operating frequency of the link. The selected frequency of conventional repeaters, however, was fixed to a specific value which was generally determined by the coupling between the Tx resonators. Because of this, the coupling increase was previously limited to a factor of two. Although doubling the coupling is the limit if the Q-factors of the original Tx coil and the additional coil are the same, in practice, the Q-factors of different coils are usually not the same. The Tx is driven by a power amplifier (PA), for example, which has finite output resistance. The output resistance of power amplifier is connected in series with the Tx coil, and significantly reduces the overall Q-factor of the original Tx coil. In such cases, the degree of resonance enhancement can be further increased. Unfortunately, conventional methods are limited to doubling the degree of coupling.

One attempt to address performance degradation in wireless energy transfer is described in PCT/KR2012/007735 ("the '735 PCT") filed by Ahn et al (now published as WO2013118954). The '735 PCT adjusts the resonance frequency of the transmitter and the enhancing resonator such that the effective resonance frequency is either the same as the excitation frequency or the receiver resonance frequency. As a result, the level of resonance enhancement is fixed. Embodiments according to the present disclosure address this limitation by allowing the resonance enhancement to be controlled and set to a desired level.

In contrast to the '735 PCT and others, the present disclosure provides a generalized method which can control the degree of resonance enhancement to a desired value. Moreover, a method is provided to achieve improved resonance enhancement to yield the higher efficiency based on the given coils' Q-factors. The resonance frequencies of the additional resonators can be adjusted to control and improve the resonance enhancement.

SUMMARY

The present disclosure relates to a method for efficient wireless power transmission across inductive links, for example, those shown in shown in FIG. 1, which can provide improved power transfer efficiency (PTE). The same method can also extend the reading range of passive RFID transponders by increasing both PTE and the signal to noise-interference ratio (SNIR) of received back telemetry data. This system can include a conventional 2-, 3-, n-coil inductive link, in which the transmitter (Tx) coil can be designed with multiple coplanar or stacked coils tuned to higher frequencies (see FIG. 2).

In this system, the resonance frequencies of Tx coils can be intentionally designed to be higher than the operating frequency. Such detuning can increase the effective transmitter inductance and the magnetic field intensity around the Tx resonator. This is equivalent to increasing the effective permeability, $\mu_r$, to enhance the resonance-coupling between the Tx and Rx coils.

Another way to describe this effect using circuit theory is that the proposed detuning can change the magnitude and phase of the electric current induced in the Rx coil by each Tx coil and force them into phase. The in-phase currents from the Tx coils will all sum up in the Rx coil and can significantly increase the PTE while adding only slightly to the power dissipation due to the added coils. The difference between this method and conventional 4-coil links, in which all coils are tuned to the same frequency, is that the currents of the two Tx coils in the 4-coil link sum up at the Rx coil with 90 degrees of phase shift and, therefore, do not result in maximum possible delivered power to the load. By changing the resonance frequency of one of the Tx coils to add the Rx currents in phase, there can be two effective paths for coupling between Tx and Rx coils, which can result in enhancement of the coupling between Tx and Rx coils.

The same technique can also be used in RFID applications to extend the reading range because enhancing the coupling results in larger variations in the current on the Tx coil due to load-shift-keying (LSK) across the Rx coil. Forward telemetry amplitude-shift-keying (ASK) can also be used for forward data transmission from reader to the transponder by detuning the added resonators on the Tx side. This method enjoys simplicity, low power consumption, and also decouples the ASK-modulation circuitry from the driver, which can provide high driver efficiency.

DETAILED DESCRIPTION

Figure 2A:
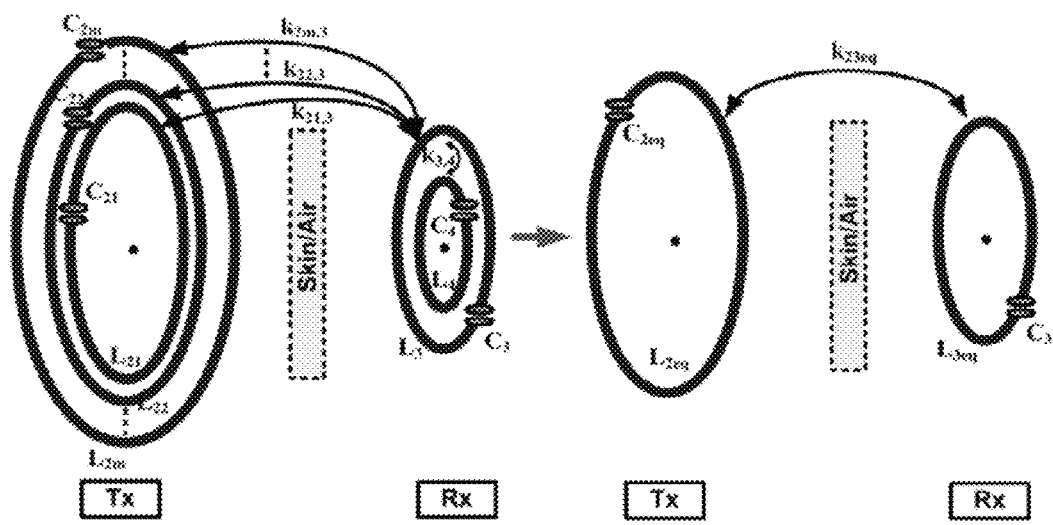
FIG. 2A illustrates a proposed coplanar arrangement for an inductive link having capacitively-loaded conductors, in accordance with some embodiments of the present disclosure.
Figure 2B:
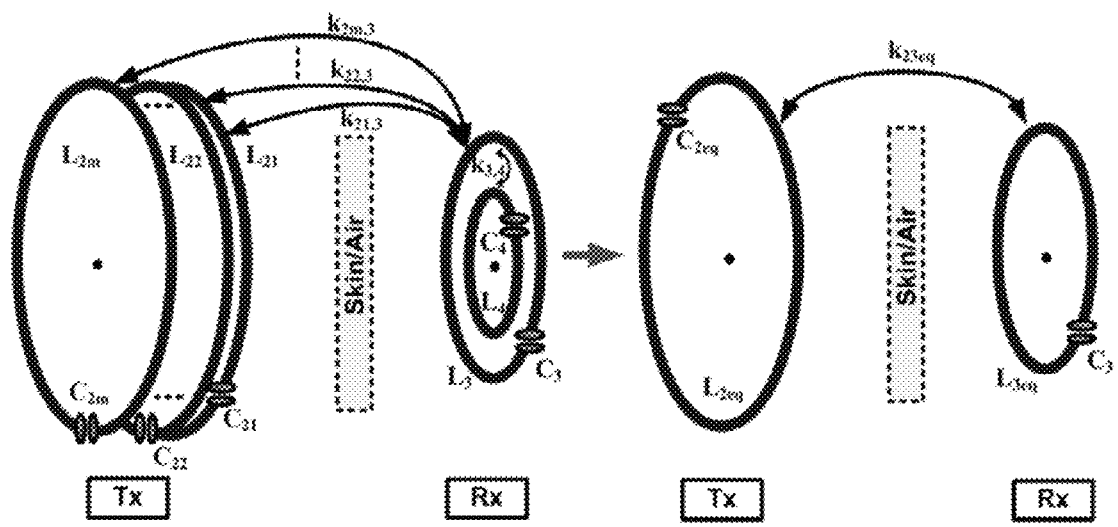
FIG. 2B illustrates a proposed stacking arrangement for an inductive link having capacitively-loaded conductors, in accordance with some embodiments of the present disclosure.

Embodiments of the present disclosure provide a system and method to further increase the PTE of conventional 2-coil or 3-coil inductive link includes enhancing the coupling between the Tx and Rx coils by using multiple resonators at the Tx side as shown in FIG. 2. By proper design of these additional resonators, the magnetic resonance coupling can be enhanced. Tx coil can be constructed either in a coplanar way (FIG. 2A) by combining m coils in the same plane with different diameters or by stacking m identical coils on top of each other (FIG. 2B). In these configurations, $L_{21}$ and $L_4$ are connected to the PA and $R_L$, respectively. Because $L_4$ can always be added for impedance matching between any $R_L$ and the rest of the link, for the sake of simplicity, a matched $R_L$ can be considered to be connected to $L_3$.

Figure 3:
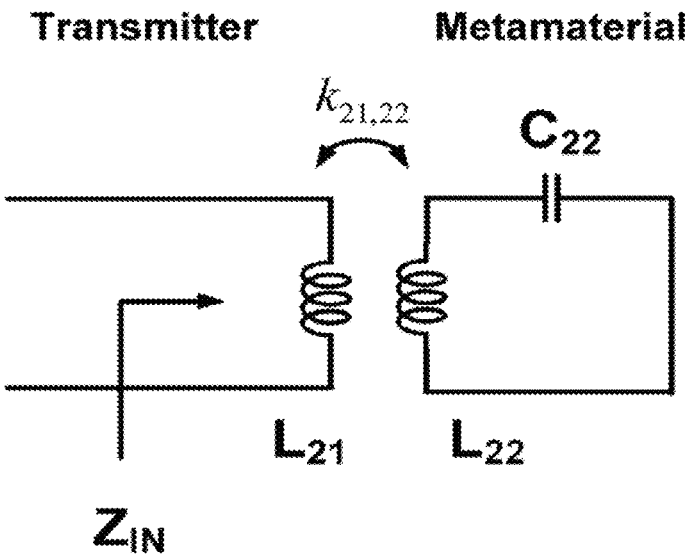
FIG. 3 illustrates a schematic representing the relationship between the resonance frequency of a metamaterial compared to an operating frequency.

A. Effect of Magnetic Resonance on Amplification of the Effective Permeability and its Resemblance to Metamaterials FIG. 3 illustrates how the Tx coil inductance $L_2$ is effectively increased by a factor of $$\mu_r = \left(1 + \frac{k_{21,22}^2}{\frac{\omega_M^2}{\omega_0^2} - 1}\right) \tag{1}$$

if an additional $L_{22}C_{22}$ tank is introduced near $L_{21}$ and the resonance frequency of the additional resonator is designed to be higher than the operating frequency. Physically, the added resonator increases the magnetic field which is stored around the two resonators. Therefore, the factor (1) is equivalent to the relative permeability $\mu_r$ in static field theory, and the added $L_{22}C_{22}$ tank is equivalent to a single-cell positive permeability metamaterial.

Figure 4:
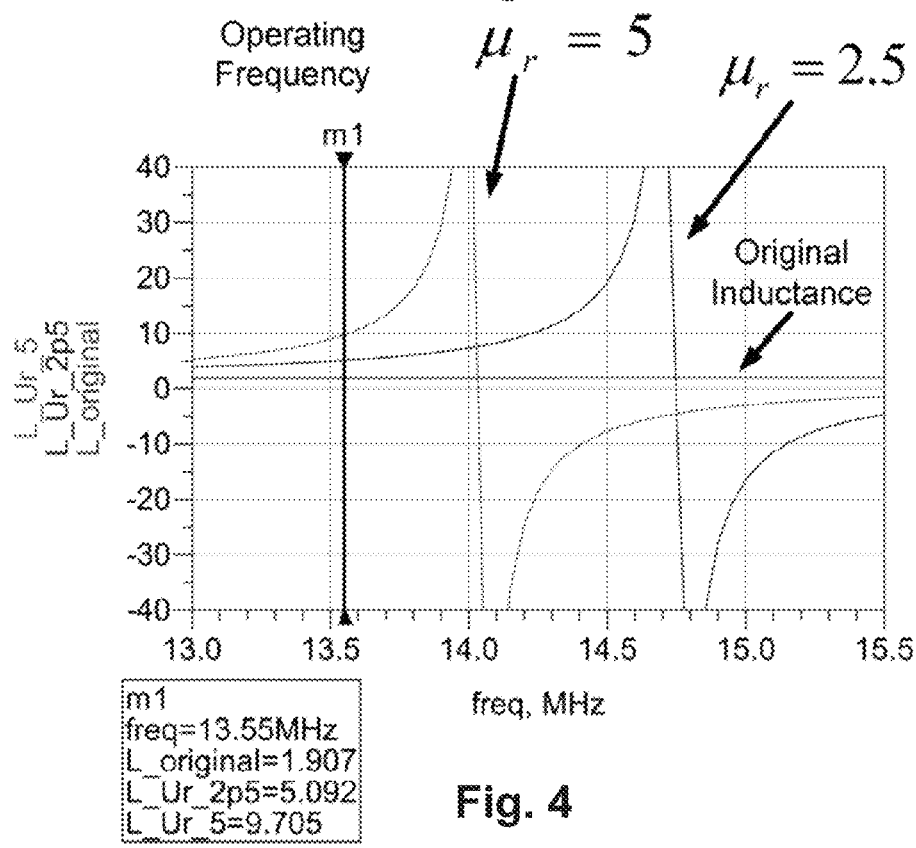
FIG. 4 is a graphical representation of the effective inductance as a function of the resonance frequency of an additional resonator.

FIG. 4 illustrates that the inductance is indeed increased when the additional resonator ($L_{22}C_{22}$, which behaves like metamaterial with positive permeability) is introduced. Moreover, the degree of inductance amplification can be controlled by changing the resonance frequency of the added resonator, $\omega_M$, as can be seen from the permeability relation of (1). The concept of controlling the permeability by changing the resonance frequency of the additional resonator is one of the key points in this disclosure.

Figure 5:
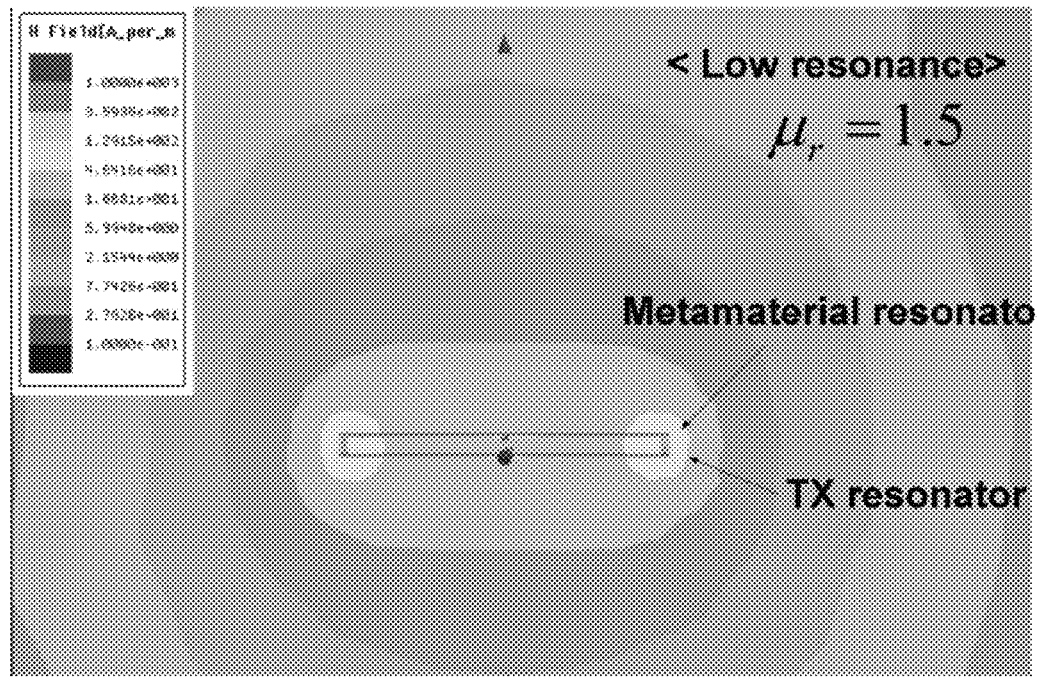
FIG. 5 is a simulated pictorial representation of the magnetic field around a transmitter when the permeability of the metamaterial resonator is set to be low.
Figure 6:
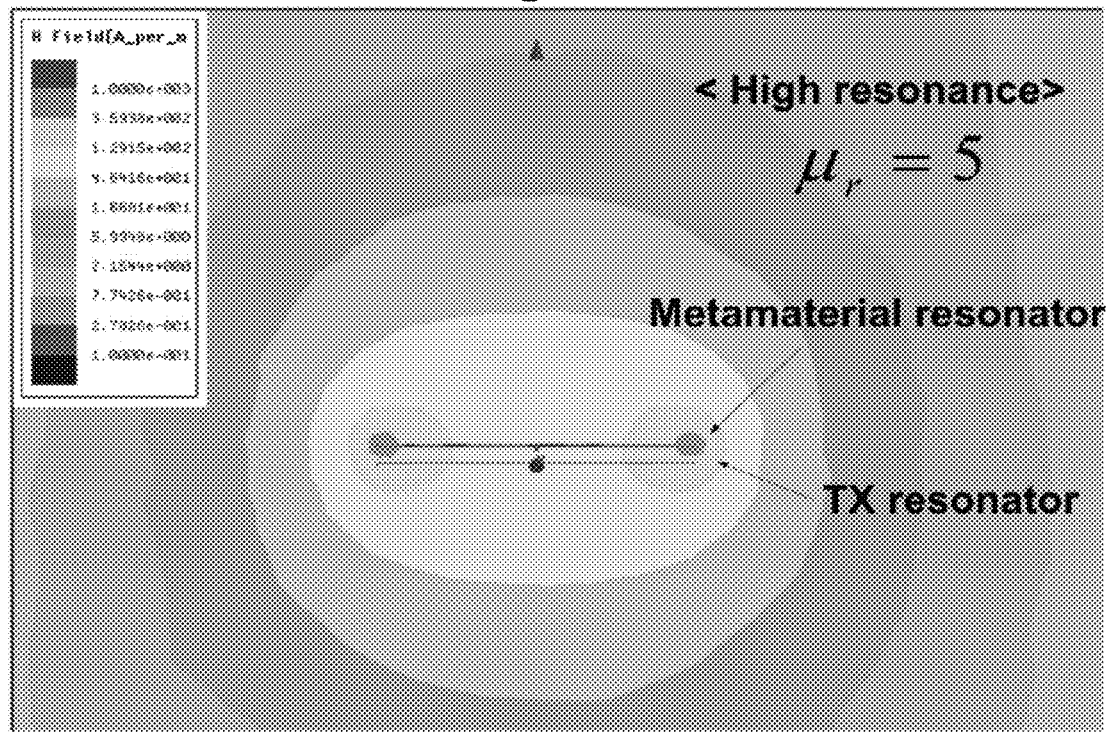
FIG. 6 is a simulated pictorial representation of the magnetic field around a transmitter when the permeability of the metamaterial resonator is set to be high.

Using magnetic field simulations in the HFSS environment, FIGS. 5 and 6 illustrate that the magnetic field intensity is increased if the permeability in (1) is designed to be high. In one method of interpreting the effect that has been utilized in this disclosure, it is the enhanced permeability that boosts the magnetic field intensity and eventually improves the resonant-coupling between the Tx and Rx coils.

B. Phase Difference Between Resonators According to their Resonance Frequencies

At the first glance, such configuration in FIG. 2 with m=2 might look like a conventional 4-coil link. However, the difference is that in a conventional 4-coil link all coils are tuned at the same frequency, $\omega_0$, while some of the coils in the proposed inductive link can be intentionally detuned. In addition, in the 4-coil link, usually a small diameter $L_1$ is used to reduce $k_{12}$ and increase the delivered power to the load. This results in a $k_{13} \ll k_{23}$ such that $k_{13}$ can be neglected. Therefore, in a traditional 4-coil link there would effectively be only one strong coupling path from Tx to the Rx. In the inductive link of the present disclosure, the PA (driver) and Rx coils can be tuned to $\omega_0$. However, in order to have multiple effective coupling paths between Tx and Rx, $L_{21}$ is also tuned at $\omega_0$ while $L_{22}$-$L_{2m}$ are all tuned at $\omega_M > \omega_0$. The method of finding $\omega_M$ and its effect on the PTE can be determined using circuit analysis.

Figure 1A:
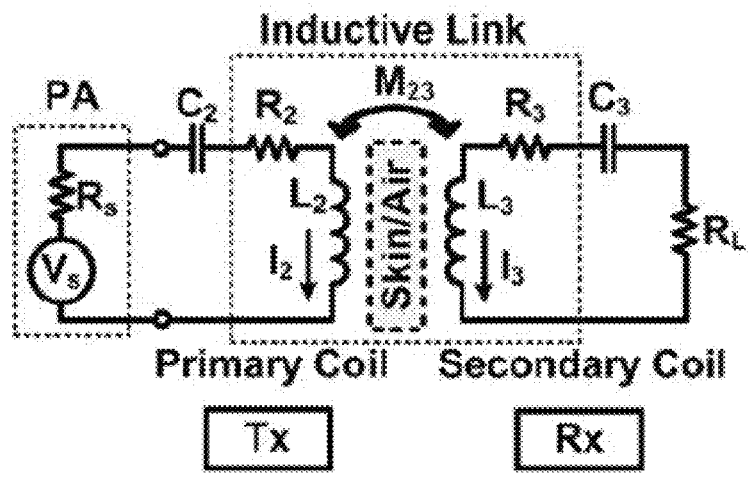
FIG. 1A illustrates a schematic of a conventional 2-coil inductive link
Figure 1B:
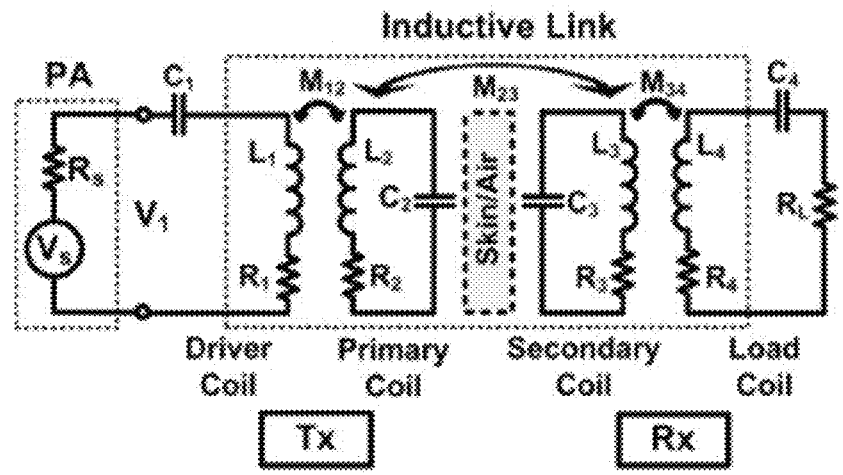
FIG. 1B illustrates a schematic of a conventional 4-coil inductive link
Figure 1C:
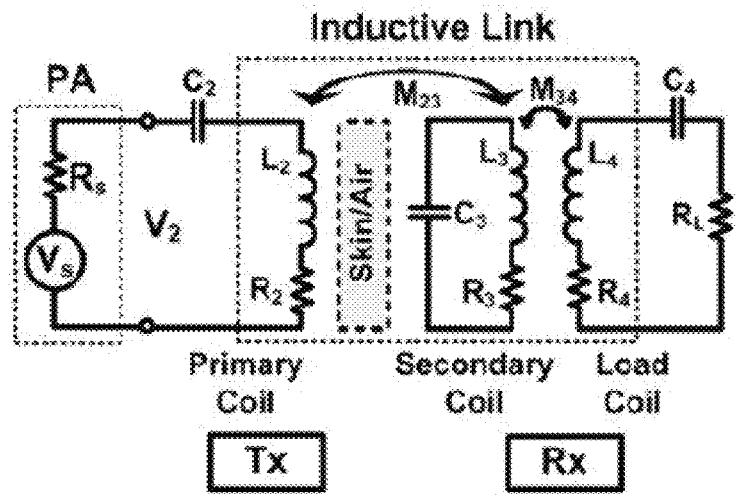
FIG. 1C illustrates a schematic of a conventional 3-coil inductive link

First, the present disclosure demonstrates how detuning an LC-tank can change the phase difference between the currents of primary and secondary coils in a 2-coil link Assuming that the $L_3C_3$-tank in FIG. 1A is tuned at $\omega_M$ while $L_2C_2$-tank is resonating at $\omega_0$, the current in $L_2$ and $L_3$ can be found from, $$\left(\frac{1}{j\omega C_2} + j\omega L_2 + R_2 + R_s\right)I_2 + j\omega M_{23}I_3 = V_s \qquad (R_2+R_s)I_2 + j\omega M_{23}I_3 = V_s \tag{2}$$
$$\left(\frac{1}{j\omega C_3} + j\omega L_3 + R_3 + R_L\right)I_3 + j\omega M_{23}I_2 = 0 \quad \Rightarrow \quad \left(1 + \frac{j\omega L_3}{R_3+R_L}\left(1 - \frac{\omega_M^2}{\omega_0^2}\right)\right)I_3 + \frac{j\omega M_{23}}{R_3+R_L}I_2 = 0$$

assuming that the Tx coil is matched to the driver frequency ($\omega_0$) and the Rx coil is detuned to $\omega_M$. The magnitude and phase difference between $I_2$ and $I_3$ can be calculated by solving the equations in (2) as, $$\left|\frac{I_3}{I_2}\right|^2 = \frac{R'_{ref}/(R_3+R_L)}{1+Q_{3L}^2(1-\omega_M^2/\omega_0^2)^2}, \; R'_{ref} = k_{23}^2 \omega_0 L_2 Q_{3L} \quad (3)$$

$$\angle I_3 - \angle I_2 = -90 - \tan^{-1}(Q_{3L}^2(1-\omega_M^2/\omega_0^2))$$

where $R'_{ref}$ is the reflected resistance on to the Tx coil when $L_3C_3$ is tuned at $\omega_0$ and $Q_{3L}=\omega_0 L_3/(R_3+R_L)$ is the loaded Rx quality factor. In this condition, the actual reflected impedance on to the Tx coil when $L_3C_3$ is tuned at $\omega_M$ includes both resistive and reactive parts, which can be written as, $$R_{ref} = \frac{R'_{ref}}{1+Q_{3L}^2(1-\omega_M^2/\omega_0^2)^2} \quad (4)$$

$$X_{ref} = \frac{-jR'_{ref}Q_{3L}(1-\omega_M^2/\omega_0^2)}{1+Q_{3L}^2(1-\omega_M^2/\omega_0^2)^2}$$

Figure 7:
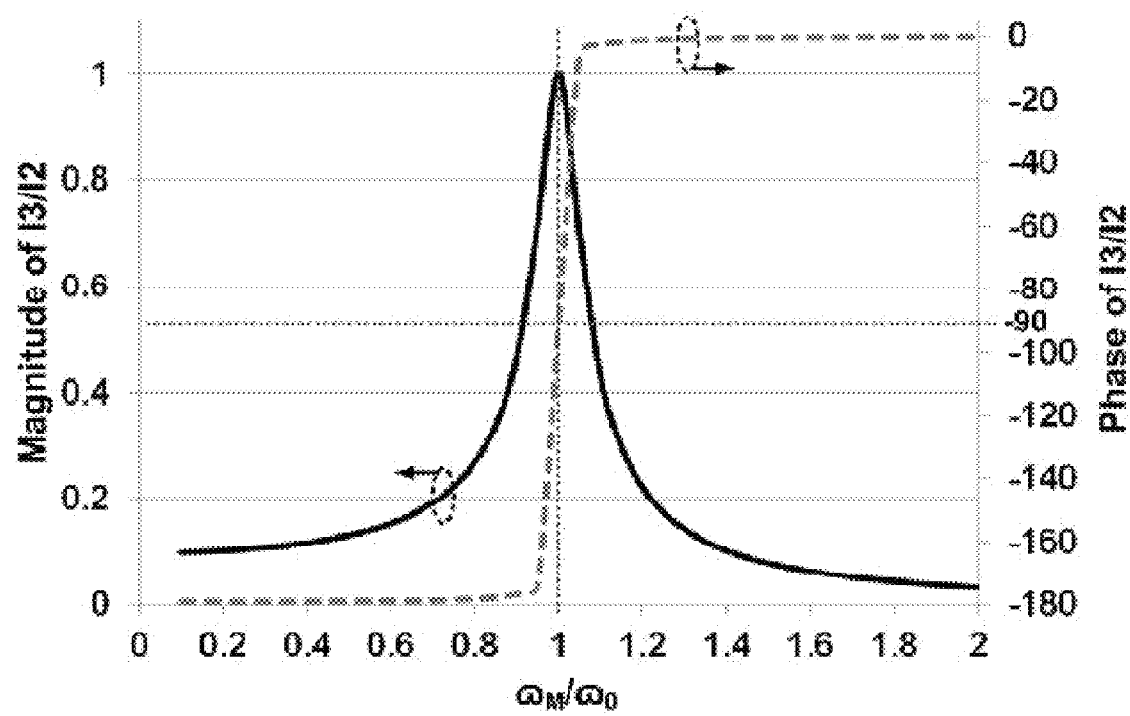
FIG. 7 is a graphical representation of the relationship between phase and magnitude of currents in the coupled transmitter and receiver coils.

The key point in (3) is that at $\omega_M=\omega_0$, the phase difference between $I_2$ and $I_3$ becomes 90° while it reduces to zero for $\omega_M \gg \omega_0$ and increases to 180° at $\omega_M \ll \omega_0$, as shown in FIG. 7. Also, $\omega_M$ can be used to reduce the reflected resistance onto the Tx coil to adjust the ratio between the currents in the Tx and Rx coils. Tuning the system according to these principles can provide more flexibility in designing wireless power and data transfer links and increasing the PTE.

Figure 8:
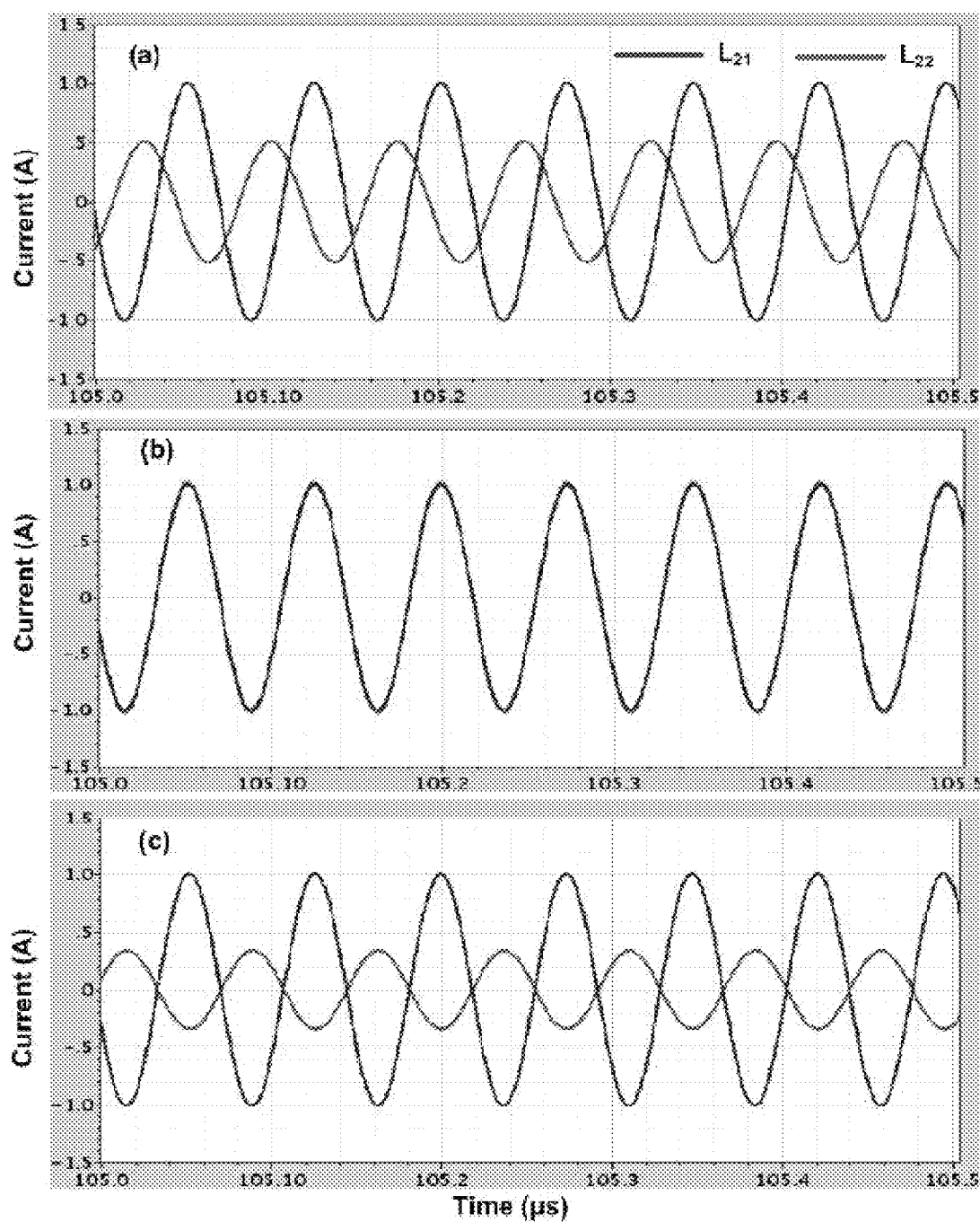
FIG. 8 is a simulated graphical representation of the currents flowing in the transmitter coils of a proposed arrangement as shown in FIG. 2.

FIG. 8 shows the normalized currents flowing in the Tx coils of the proposed link in FIG. 2, with two coils on the Tx side (m=2) in three different scenarios, simulated in SPICE. FIG. 8, graph (a), shows the currents of $L_{21}$ and $L_{22}$ coils when both coils are tuned at 13.56 MHz. This is the case in conventional 4-coil links. It can be seen that these currents have 90° phase shift as predicted by (3). $k_{21,22}$ is intentionally reduced to 0.01 by reducing its outer diameter to allow a considerable current in $L_{21}$ compared to $L_{22}$. In this case, the coupling between $L_{21}$ and $L_3$ also drops significantly, which further reduces the load power in the 4-coil link Increasing $k_{21,22}$, on the other hand, leads to smaller current in $L_{21}$, further decreasing its contribution to the output power. FIG. 8, graph (b), shows the results for the these coils when $k_{21,22}=0.5$ and $L_{22}$ was detuned from 13.56 to 16.5 MHz. It can be seen that it is possible to force $L_{21}$ and $L_{22}$ currents to be in-phase and have equal amplitude by detuning $L_{22}$ to a higher frequency. Because $L_{21}$ and $L_{22}$ are identical, the optimal PTE is achieved when they carry the same amount of currents. FIG. 8, graph (c), shows the simulation results when $L_{22}$ was detuned from 13.56 to 12.5 MHz. It can be seen that $L_{21}$ and $L_{22}$ currents are out-of-phase in this case, which leads to a poor PTE. These results are in good agreement with the analysis in (3).

C. Resonant Frequency Condition for Maximum Power Transfer Efficiency (PTE)

Figure 9:
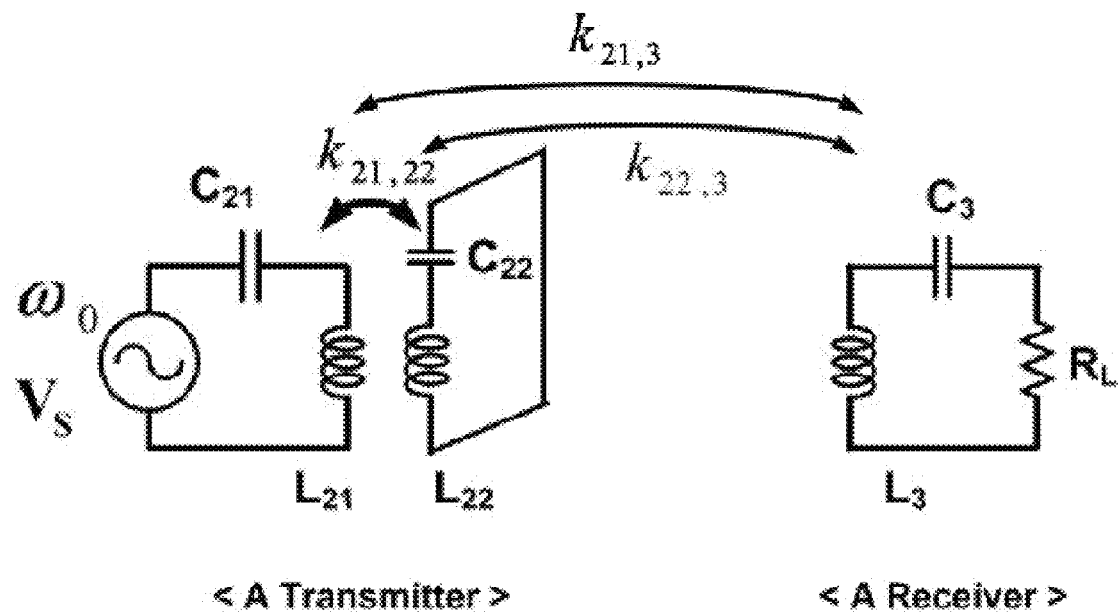
FIG. 9 illustrates a schematic of the transmitter and receiver coils with an additional resonator on the transmitter side, in accordance with some embodiments of the present disclosure.

The enhanced resonance transmitter can be used to improve the efficiency of wireless power transfer link Complete system schematic including the additional metamaterial resonator and the Rx coil is shown in FIG. 9, which is a similar circuit to FIG. 2 with m=2. The power transfer efficiency (PTE) in this case can be defined as, $$PTE_{m-2} = \frac{(R_3+R_L)|I_3|^2}{(R_{21}+R_S)|I_{21}|^2+R_{22}|I_{22}|^2+(R_3+R_L)|I_3|^2} \frac{R_L}{(R_3+R_L)} \quad (5)$$

$$= \frac{1}{\frac{R_{21}+R_{21}}{R_3+R_L}\left|\frac{I_{21}}{I_3}\right|^2 + \frac{R_{22}}{R_3+R_L}\left|\frac{I_{22}}{I_3}\right|^2 + 1} \frac{Q_{3L}}{Q_L},$$

where $Q_{3L}=\omega_0 L_3/(R_3+R_L)$ and $Q_L=\omega_0 L_3/R_L$. $R_{21}$, $R_{22}$, and $R_3$ are the parasitic resistance of $L_{21}$, $L_{22}$, and $L_3$, respectively. $R_s$ is the source resistance of transmitter voltage source. The current ratios are found from KVL equation, resulting in, $$\frac{I_{21}}{I_3} = \frac{j(R_3+R_L)}{k_{21,3}\omega_0\sqrt{L_{21}L_3}} \frac{1}{1+\frac{k_{22,3}(\mu_r-1)}{k_{21,3}k_{21,22}}}, \quad (6)$$

$$\frac{I_{22}}{I_3} = \frac{j(R_3+R_L)}{k_{22,3}\omega_0\sqrt{L_{22}L_3}} \frac{\frac{k_{22,3}(\mu_r-1)}{k_{21,3}k_{21,22}}}{1+\frac{k_{22,3}(\mu_r-1)}{k_{21,3}k_{21,22}}},$$

where $\mu_r$ can be found from (1). By substituting (6) in (5), the PTE can be found from, $$PTE_{m-2} = \frac{1}{\frac{1}{k_{21,3}^2 Q_{21} Q_{3L}}\left|1+\frac{k_{22,3}(\mu_r-1)}{k_{21,3}k_{21,22}}\right|^2 + \frac{1}{k_{22,3}^2 Q_{22} Q_{3L}}\left|\frac{\frac{k_{22,3}(\mu_r-1)}{k_{21,3}k_{21,22}}}{1+\frac{k_{22,3}(\mu_r-1)}{k_{21,3}k_{21,22}}}\right|^2 + 1} \frac{Q_{3L}}{Q_L} \quad (7)$$

The condition for maximum PTE is found by differentiating (7) with respect to $\mu_r$, which results in, $$\frac{\mu_r-1}{k_{21,22}} = \frac{k_{21,22}}{\frac{\omega_M^2}{\omega_0^2}-1} = \frac{k_{22,3}}{k_{21,3}}\frac{Q_{22}}{Q_{21}} \text{ and} \quad (8)$$

$$\omega_M = \omega_0 \sqrt{1+k_{21,22}\frac{k_{21,3}Q_{21}}{k_{22,3}Q_{22}}}$$

Figure 10:
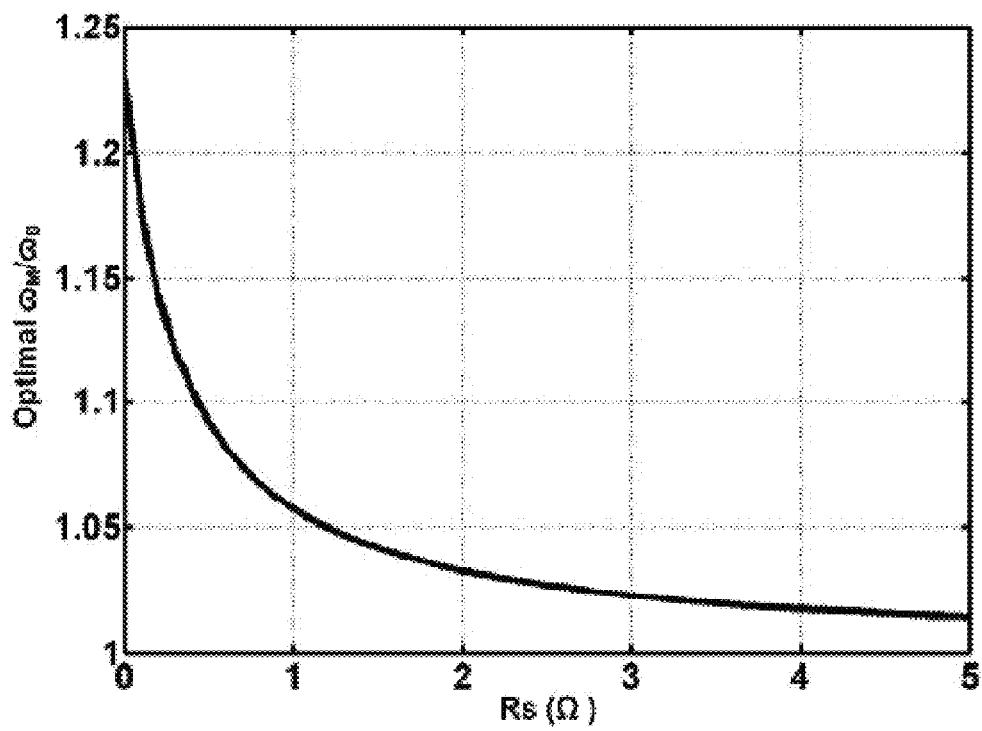
FIG. 10 is a graphical representation of the effect of source resistance, $R_s$, on the optimal detuned frequency of the added transmitter coil.

Note that the optimal permeability, $\mu_r$, or the optimum resonance frequency, $\omega_M$, for the added $L_{22}C_{22}$ metamaterial resonator are functions of the Q-factors of resonators within Tx and Rx. In contrast, the previous literature used a fixed resonance frequency condition of $(\mu_r-1)/k_{21,22}=1$ or equivalently $\omega_M=\omega_0\sqrt{1+k_{21,22}}$, which did not account for the differences in Q-factors. Since the (8) of the present disclosure adjusts the resonance frequency according to the difference between Q-factors, this allows the designer to maximize the PTE under various realistic Q-factors. In practice, coil geometries on the Tx side are not necessarily identical, and their Q-factors can be quite different because $L_{21}C_{21}$ tank is connected to the output resistance of power amplifier, while $L_{22}C_{22}$ tank only has the parasitic resistance of $L_{22}$ ($R_{22}$). In this condition, $\omega_M$ is the design parameter that can adjust the degree of resonance amplification in order to maximize the PTE. FIG. 10 shows a MATLAB simulation for optimal $\omega_M/\omega_0$ vs. $R_s$.

Figure 11:
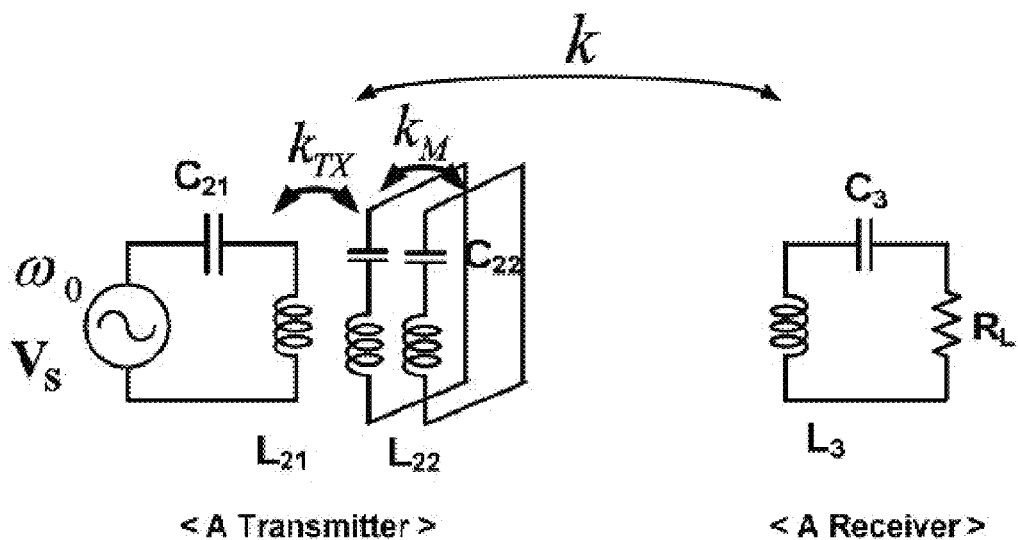
FIG. 11 illustrates a schematic of a system having additional resonators as part of the transmitter, in accordance with some embodiments of the present disclosure.

The number of added resonant LC tanks can be more than two, as in FIG. 11. In this case, the losses from added LC tanks are reduced and higher magnetic resonance is allowed. For the two added LC tanks (m=3), the relative permeability can be found from, $$\mu_r = 1 + \frac{2k_{TX}^2}{\frac{\omega_M^2}{\omega_0^2} - (1 + k_M)}. \quad (9)$$

assuming that $k_{21,22}=k_{21,23}=k_{TX}$, $k_{21,3}=k_{22,3}=k_{23,3}=k$, $k_{22,23}=k_M$, and $Q_{22}=Q_{23}=Q_M$. The calculated PTE is $$PTE_{m=3} = \frac{1}{\frac{1}{k^2 Q_{21} Q_3} \left|\frac{k_{TX}}{k_{TX} + (\mu_r - 1)}\right|^2 + \frac{1}{2k^2 Q_M Q_3} \left|\frac{(\mu_r - 1)}{(\mu_r - 1) + k_{TX}}\right|^2 + 1}, \quad (10)$$

The added resonant coils' loss (metamaterial loss) has been reduced by half, i.e.

$$\frac{1}{2} \frac{1}{k^2 Q_M Q_3}.$$

Therefore, higher permeability is allowed. The condition for maximum PTE can be found by differentiating (10) with respect to $\mu_r$, which results in, $$\frac{\mu_r - 1}{k_{TX}} \equiv \frac{2k_{TX}}{\frac{\omega_M^2}{\omega_0^2} - (1 + k_M)} = \frac{2Q_M}{Q_{21}} \quad (11)$$

In general, the PTE equations can be extended to a link with m coils on the Tx side similar to FIG. 2. In this case, a combination of the Tx coils can be modeled with a single coil with an equivalent coupling with the Rx coil, $k_{23eq}$, and an equivalent quality factor, $Q_{2eq}$, which can be found from, $$k_{23eq}^2 = k_{21,3}^2 + k_{22,3}^2 + \ldots + k_{2m,3}^2 \quad (12)$$

$$Q_{2eq} = \frac{k_{21,3}^2 Q_{21} + k_{22,3}^2 Q_{22} + \ldots + k_{2m,3}^2 Q_{2m}}{k_{21,3}^2 + k_{22,3}^2 + \ldots + k_{2m,3}^2}$$

In the case of using m identical coils at the Tx with $k_{21,3}=k_{22,3}=\ldots=k_{2m,3}=k$ and $Q_{21}=Q_{22}=\ldots=Q_{2m}=Q$, the equivalent coupling and Q are, $k_{23eq}=\sqrt{m}k$ and $Q_{2eq}=Q$, respectively, which clearly shows that the coupling coefficient has been enhanced in this multi-coil power transfer system.

D. Data Transmission

In RFID applications, extending the distance between the reader and passive transponder is of a great interest. The reading range of convention RFIDs is limited due to: 1) The PTE is low between the reader and transponder coils and, therefore, the transponder cannot be powered at large distances, and 2) The voltage or current variations on the reader coil due to LSK modulation (shorting the transponder coil for a short period of time) are not large enough to be detected by the reader. The power carrier signal across the reader coil is much larger than the LSK voltage variations due to data-bits reflected back from the transponder coil, resulting in a small signal-to-noise-interference ratio (SNIR) at the receiver input on the reader side. The SNIR even becomes smaller if the reader is required to transfer more power at larger reading distances. The present disclosure can increase the reading range of the passive transponders by increasing both the PTE and SNIR.

Figure 12:
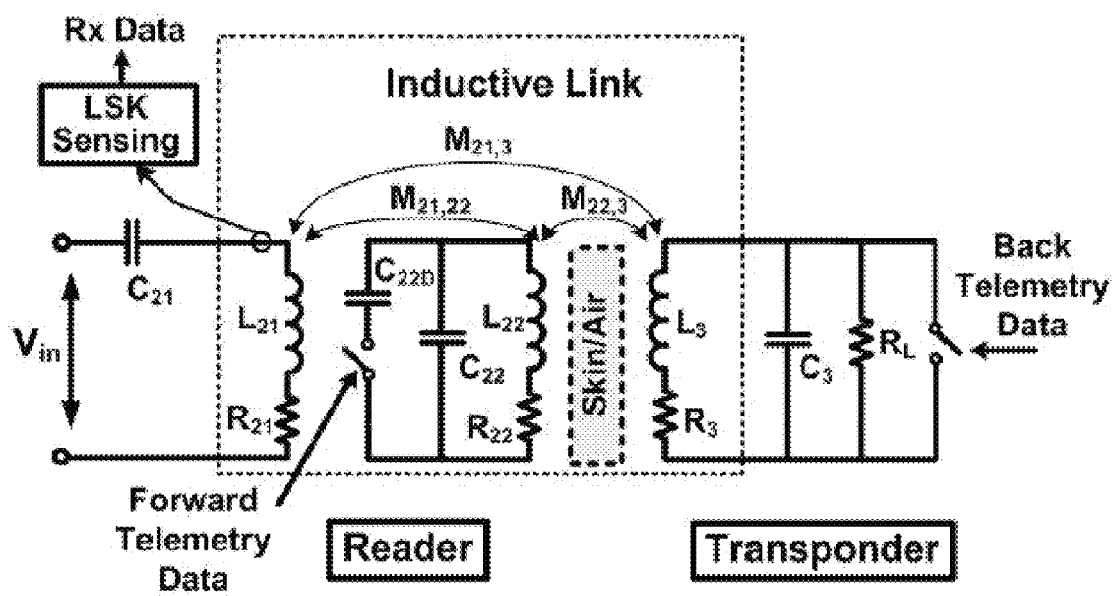
FIG. 12 illustrates a schematic of a system having two coils on the transmitter side arranged to extend the reading range in a radio frequency identification (RFID) application, in accordance with some embodiments of the present disclosure.

FIG. 12 shows the schematic diagram of a proposed extended-range RFID link according to the present disclosure with only two coils at the Tx (m=2). In general, there could be m coils at the Tx side similar to FIG. 2. The transponder shorts $L_3$ for a short period of time to transmit each data bit back to the reader based on LSK modulation. In this case, when the LSK switch is closed, the load is not reflected back to the Tx coils and this change results in some voltage variation across the Tx coil(s). Therefore, a higher change in reflected impedance, which can also be interpreted as the LSK modulation index, is desirable. In a conventional 2-coil link (FIG. 1A), the reflected load from the secondary to the primary and the modulation index can be written as, $$R_{in} = R_2 + R_{ref} = R_2(1 + k_{23}^2 Q_2 Q_{3L}) = R_2(1 + m_i) \quad (13)$$

where $Q_{3L}$ is the loaded Q of $L_3$ ($Q_{3L}=0$ when $R_L$ is shorted) and $m_i$ is the modulation index, which relates to the SNIR. It can be seen that higher $m_i$ results in higher impedance change across the reader coil and, therefore, higher voltage variation. The previous section illustrates that the proposed enhanced coupled link with m coils at the Tx side can be modeled as a simple 2-coil link with an equivalent coupling and Q as in (12). Therefore, the modulation index of the proposed link can be written as, $$m_i = k_{23eq}^2 Q_{2eq} Q_{3L} = k_{21,3}^2 Q_{21} + k_{22,3}^2 Q_{22} + \ldots + k_{2m,3}^2 Q_{2m} \quad (14)$$

For example, if m identical coils are used on the reader side with each having coupling k to the transponder coil and a quality factor of Q, the modulation index will be m times larger than a simple 2-coil link Therefore, the SNIR increases significantly by using the proposed method.

Figure 13:
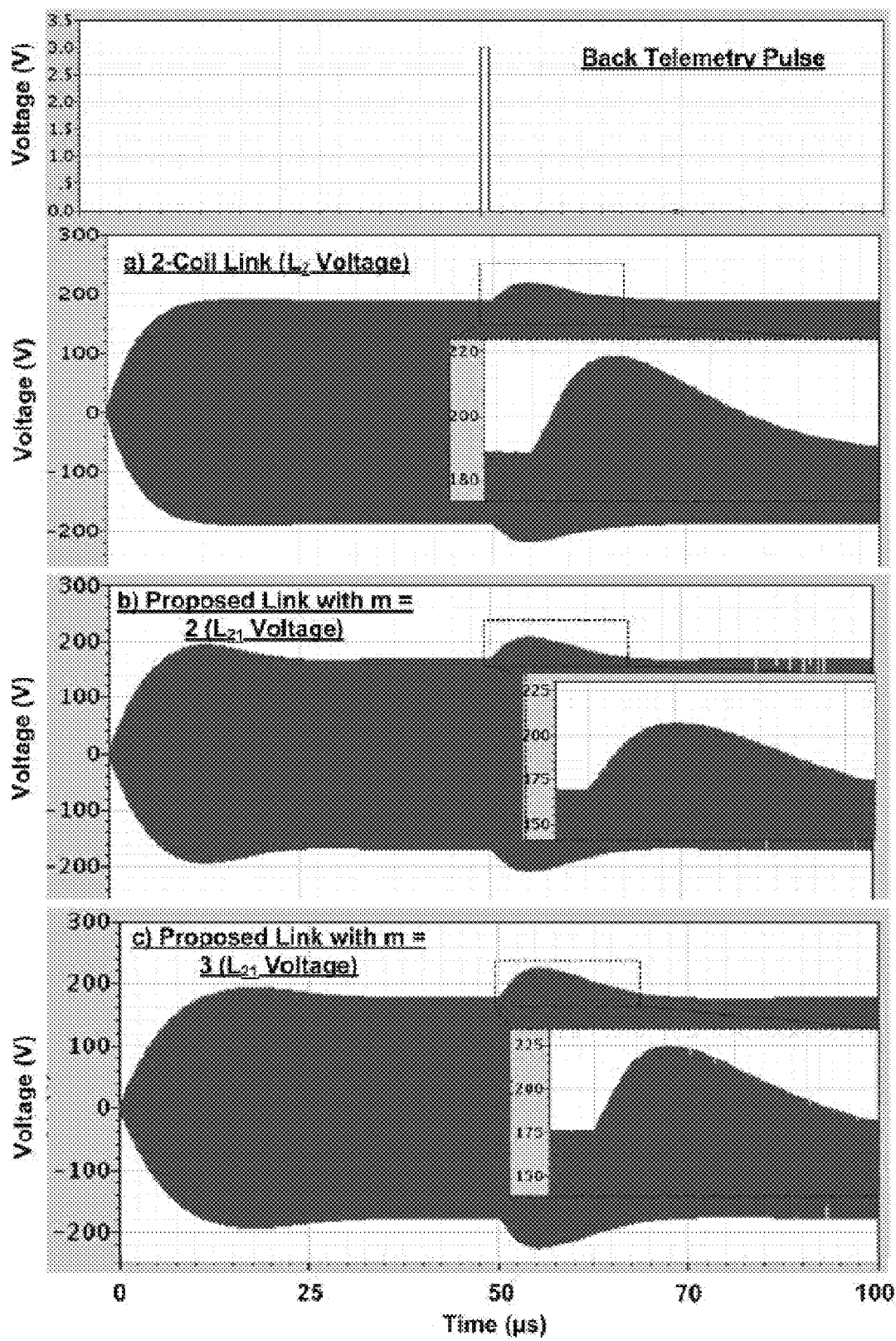
FIG. 13 is a graphical representation of transient responses to load-shift-keying for RFID applications.

FIG. 13 shows the SPICE simulation results for three different links with 13.56 MHz carrier frequency. FIG. 13, graph (a), shows the voltage variations across the Tx coil of the 2-coil link in FIG. 1A, when the Rx coil was shorted for 1 μs. FIG. 13, graphs (b) and (c) show the variations across $L_{21}$ in the proposed enhanced-coupled link for m=2 (FIG. 11) when $L_{22}$ was tuned at 16.5 MHz, and m=3 when $L_{22}$ and $L_{23}$ were tuned at 19.6 MHz, respectively, for the same condition as that of the 2-coil link. It can be seen from FIG. 13 that the voltage variations have increased from 15.9% in the 2-coil link to 22.5% and 27.7% in the proposed link with m=2 and 3, respectively. It should also be noted that in addition to the 74% increase in the SNIR for m=3, the proposed links has achieved PTE of 2.3% and 3.1% for m=2 and 3, respectively, while the 2-coil link PTE was only 1.4%. This increase in PTE can further help to extend the reading range.

Figure 14:
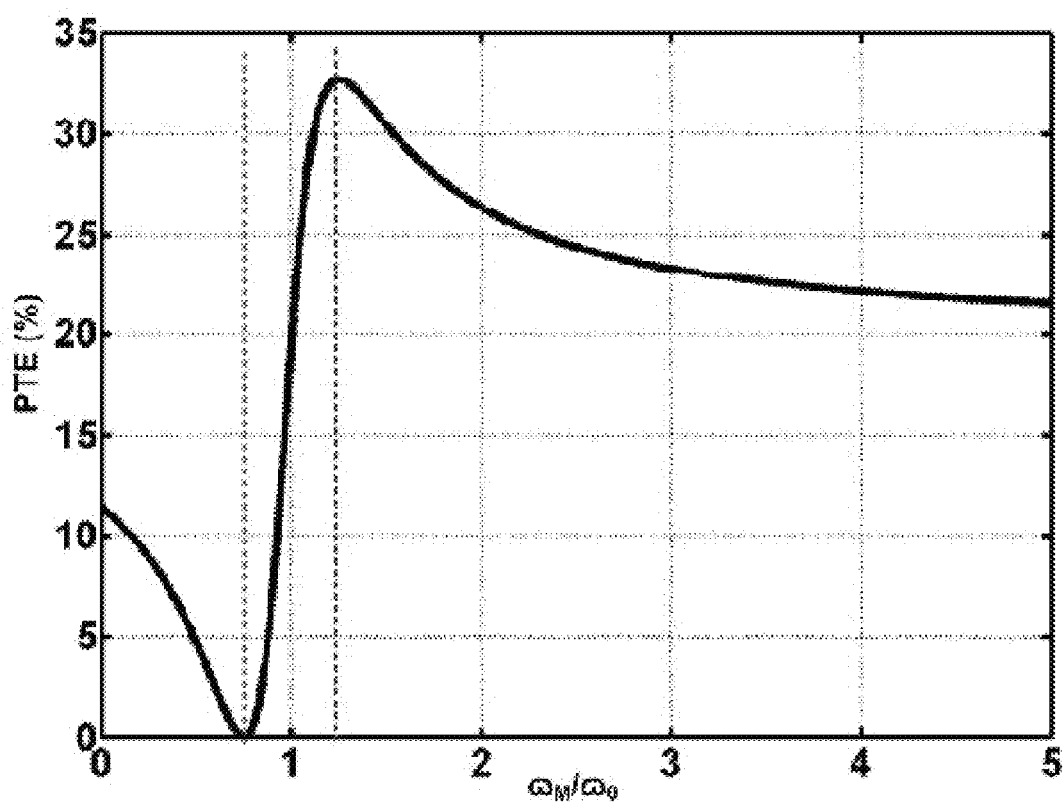
FIG. 14 is a graphical representation of power transfer efficiency (PTE) as a function of the ratio of $\omega_M/\omega_0$.
Figure 15:
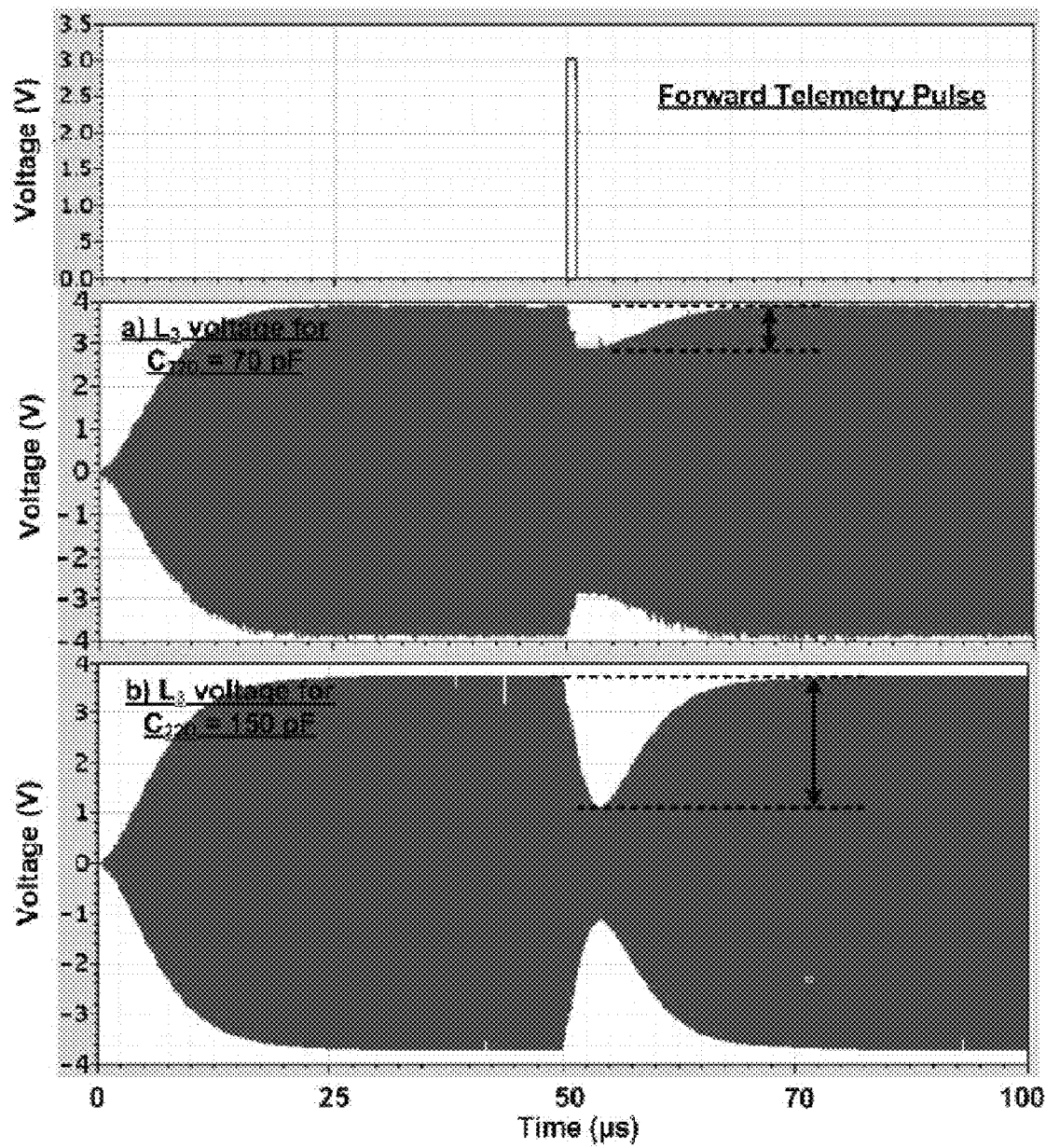
FIG. 15 is a graphical representation of transponder voltage in response to forward telemetry data in the circuit illustrated in FIG. 11.

In RFID systems, the reader first interrogates the transponder by sending some signals through the same power carrier using ASK modulation. In order to modulate the power carrier amplitude, either the PA transistor should be turned off or the supply voltage should be reduced. Both methods have adverse effect on the power conversion efficiency of the PA and also add to the complexity of the Tx driver circuitry. The present disclosure proposes a new method for ASK data transmission using an enhanced-resonance link by switching a capacitor in and out across one of the added resonant LC tanks. As shown in FIG. 14, the PTE of the link depends on the detuned frequency of the added Tx coils. Therefore, a capacitor in series with a switch to $L_{22}$ resonance capacitor has been added to modulate the Rx power carrier with the incoming data as shown in FIG. 12. By adding different capacitors the modulation index can be controlled. Using this method, the PA circuitry and its supply remain intact and they can be designed with high efficiency. FIG. 15 shows the SPICE simulation results for the circuit in FIG. 11 (m=2) for two $C_{22D}$ values. By changing the resonance frequency of $L_{22}$ from 12.8 MHz to 10.5 MHz, the modulation index of the ASK-modulated data on the transponder side increases from 25% to 65%. In this simulation, the optimal resonance frequency without $C_{22D}$ was 16.5 MHz.

E. Exemplary Embodiment

In an exemplary embodiment according to the present disclosure, solid enamel magnet wires were used to construct the Tx and Rx coils. SMD ceramic capacitors with C0G/NP0 dielectric were used to tune the LC tanks because of their small loss. The operating frequency was chosen 5.1 MHz. The load resistance was 25Ω. The distance between Tx and Rx coils was 42 cm. Dimensions and number of turns of the Tx and Rx coils were (28 cm×27 cm, $Q_{TX}$=211) and (28 cm×23 cm, $Q_3$=138), respectively.

S-parameters are measured using Vector Network Analyzer. The input/output voltages/currents are extracted for the system with the measured S-parameter and source/load resistance. Although the source/load resistance of VNA is 50Ω, the measured S-parameter can be used for any different source/load resistances once the S-parameter is obtained from the 50Ω condition. The load resistance was 25Ω. Based on the voltage and current, the input and output powers can be calculated. The efficiency was readily found by the output power divided by the input power. For comparison, the conventional 4-coil transmitter was also fabricated and measured.

Figure 16:
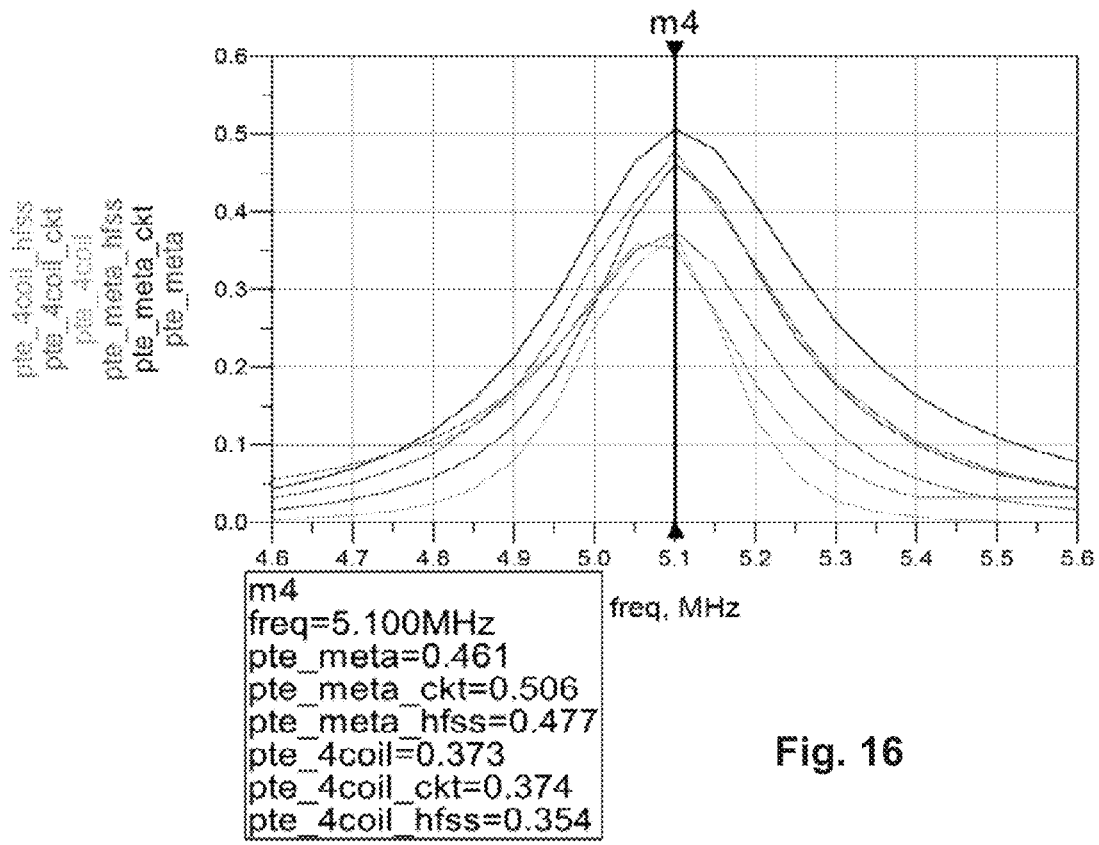
FIG. 16 is a graphical representation of measured PTE of an exemplary embodiment.

FIG. 16 presents the measurement result for zero source resistance. The PTE with the proposed additional resonator was 46.1%, while the PTE of the conventional 4-coil system was 37.3%. Therefore, the proposed link has increased the PTE by 23.6% compared to the state-of-the-art. The measured result is closely matched to the circuit simulation in ADS and field solver simulation in HFSS. Dimensions of the measurement setup were replicated in the HFSS 3-D modeling. The Q-factor of the resonators for simulation was set to be the same as the measured Q-factors. For the circuit simulation, the coupling coefficient was extracted from the HFSS. The calculated efficiency using the theoretical equation in (7) was in close agreement with the circuit simulation results.

Figure 17:
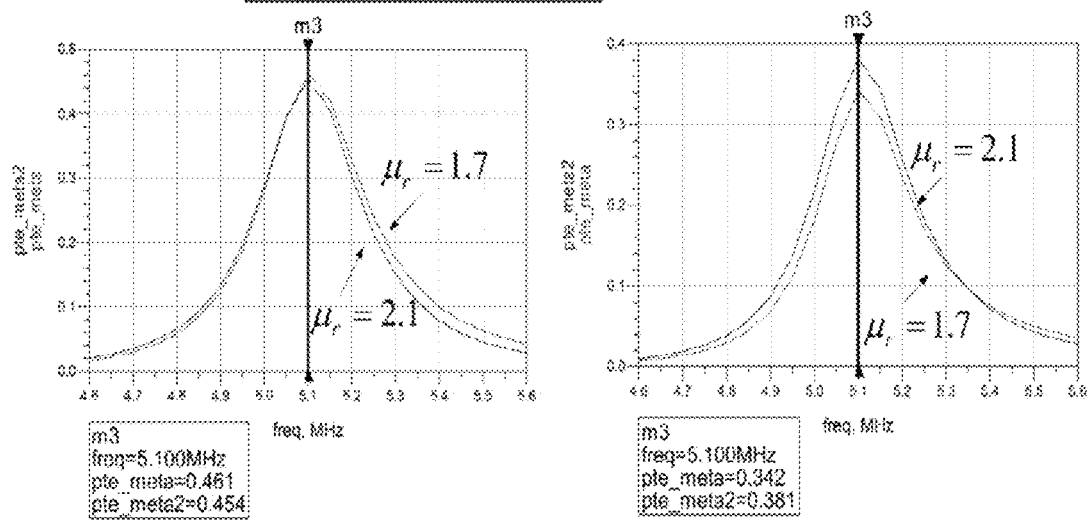
FIG. 17 is a graphical representation of measured PTE of an exemplary embodiment for varied effective permeability ($\mu_r$).

In FIG. 17, the source resistance was changed and the effect of permeability variation was observed. The source resistance degrades the Q-factor of the Tx coil. The proposed system can increase the PTE by increasing the effective permeability of the surrounding environment similar to metamaterials. This can be achieved by simply adjusting the resonance frequency of the additional hyper resonators.

What is claimed is:

1. A method of wirelessly transmitting power or data, the method comprising:
   providing a transmitter comprising a driver coil having a driver coil resonance frequency, and a first transmitter resonator coil having a first transmitter resonator coil resonance frequency;
   providing a receiver comprising a load coil having a load coil resonance frequency;
   tuning the first transmitter resonator coil resonance frequency to be higher than one or more of the driver coil resonance frequency and the load coil resonance frequency;
   selecting the first transmitter resonator coil resonance frequency based on:
   Q-factors of the driver coil, the first transmitter resonator coil, and the load coil;
   a first coupling coefficient between the driver coil and the load coil;
   a second coupling coefficient between the first transmitter resonator coil and the load coil; and
   a third coupling coefficient between the driver coil and the first transmitter resonator coil.

2. The method of claim 1, further comprising:
   tuning the driver coil and the load coil such that the driver coil resonance frequency is substantially equal to the load coil resonance frequency.

3. The method of claim 1, further comprising:
   providing a second transmitter resonator coil having a second transmitter resonator coil resonance frequency.

4. The method of claim 3, further comprising:
   selecting the first and second transmitter resonator coil resonance frequencies based on:
   Q-factors of the driver coil, the first transmitter resonator coil, and the load coil;
   the first coupling coefficient between the driver coil and the load coil;
   the second coupling coefficient between the first transmitter resonator coil and the load coil;
   the third coupling coefficient between the driver coil and the first transmitter resonator coil;
   a fourth coupling coefficient between the driver coil and the second transmitter resonator coil;
   a fifth coupling coefficient between the first transmitter resonator coil and the second transmitter resonator coil; and
   a sixth coupling coefficient between the second transmitter resonator coil and the load coil.

5. The method of claim 1, wherein the step of tuning the first transmitter resonator coil resonance frequency to be higher than one or more of the driver coil resonance frequency and the load coil resonance frequency further comprises tuning the first transmitter resonator coil such that the first transmitter resonator coil resonance frequency is less than approximately 3 times the load coil resonance frequency.

6. The method of claim 1, further comprising:
   tuning the driver coil and the load coil such that the driver coil resonance frequency is substantially equal to the load coil resonance frequency.

7. The method of claim 1, wherein the step of tuning the first transmitter resonator coil resonance frequency to be higher than one or more of the driver coil resonance frequency and the load coil resonance frequency further comprises tuning the first transmitter resonator coil such that the first transmitter resonator coil resonance frequency that is less than approximately 3 times the load coil resonance frequency.

8. An inductive power transmission system comprising:
a transmitter comprising a driver coil having a driver coil resonance frequency and a first transmitter resonator coil having a first transmitter resonator coil resonance frequency;
a receiver comprising a load coil having a load coil resonance frequency;
wherein the first transmitter resonator coil resonance frequency is selected based on:
Q-factors of the driver coil, the first transmitter resonator coil, and the load coil;
a first coupling coefficient between the driver coil and the load coil;
a second coupling coefficient between the first transmitter resonator coil and the load coil; and
a third coupling coefficient between the driver coil and the first transmitter resonator coil;
wherein the first transmitter coil resonance frequency is higher than both of the driver coil resonance frequency and the load coil resonance frequency; and
wherein the driver coil resonance frequency is substantially equal to the load coil resonance frequency.

9. The system of claim 8 wherein a ratio of the first transmitter coil resonance frequency to the driver coil resonance frequency is between approximately 1 and 3.

10. The system of claim 8 wherein the transmitter further comprises a second transmitter resonator coil having a second resonator coil resonance frequency.

11. The system of claim 10 wherein the second transmitter coil resonance frequency is higher than both of the driver coil resonance frequency and the load coil resonance frequency.

12. A method of wirelessly transmitting power or data, the method comprising:
providing a transmitter comprising a driver coil having a driver coil resonance frequency, and a first transmitter resonator coil having a first transmitter resonator coil resonance frequency;
providing a receiver comprising a load coil having a load coil resonance frequency;
tuning the first transmitter resonator coil resonance frequency to be higher than one or more of the driver coil resonance frequency and the load coil resonance frequency;
providing a second transmitter resonator coil having a second transmitter resonator coil resonance frequency;
selecting the first and second transmitter resonator coil resonance frequencies based on:
Q-factors of the driver coil, the first transmitter resonator coil, and the load coil;
a first coupling coefficient between the driver coil and the load coil;
a second coupling coefficient between the first transmitter resonator coil and the load coil;
a third coupling coefficient between the driver coil and the first transmitter resonator coil;
a fourth coupling coefficient between the driver coil and the second transmitter resonator coil;
a fifth coupling coefficient between the first transmitter resonator coil and the second transmitter resonator coil; and
a sixth coupling coefficient between the second transmitter resonator coil and the load coil.

* * * * *